(12) United States Patent
Welker

(10) Patent No.: US 7,758,021 B2
(45) Date of Patent: Jul. 20, 2010

(54) ALIGNMENT AND LOCATING TOOL

(76) Inventor: Robert E. Welker, 1403 Appleton Ct., Arnold, MO (US) 63010

( * ) Notice: Subject to any disclaimer, the term of this patent is extended or adjusted under 35 U.S.C. 154(b) by 306 days.

(21) Appl. No.: 11/776,145

(22) Filed: Jul. 11, 2007

(65) Prior Publication Data

US 2009/0014697 A1 Jan. 15, 2009

(51) Int. Cl.
*H02G 1/08* (2006.01)
(52) U.S. Cl. ............... 254/134.3 R; 254/134.3 FT; 81/429; 279/143
(58) Field of Classification Search .......... 254/134.3 R, 254/134.3 FT, 134.4; 81/451, 177.2, 429; 7/158; 408/239 R, 127; 279/75, 143; 269/8
See application file for complete search history.

(56) References Cited

U.S. PATENT DOCUMENTS

| | | | |
|---|---|---|---|
| 4,527,775 A | | 7/1985 | Flowers |
| 4,572,561 A | | 2/1986 | Hale |
| 5,049,013 A | * | 9/1991 | Engles et al. ............... 409/231 |
| 5,182,973 A | * | 2/1993 | Martindell .................... 81/429 |
| 5,266,914 A | * | 11/1993 | Dickson et al. ............. 335/288 |
| 5,522,630 A | | 6/1996 | James |
| 7,093,822 B2 | * | 8/2006 | Welker .................. 254/134.3 R |
| 7,374,377 B2 | * | 5/2008 | Bauman .................. 408/239 R |
| 7,435,042 B2 | * | 10/2008 | White et al. ................. 408/127 |
| 7,475,618 B1 | * | 1/2009 | Pardue et al. .................. 81/451 |
| 2009/0014697 A1 | * | 1/2009 | Welker .................. 254/134.3 R |

* cited by examiner

*Primary Examiner*—Lee D Wilson
(74) *Attorney, Agent, or Firm*—Charles McCloskey

(57) ABSTRACT

A tool has a cylinder with a pair of magnets, diametrically spaced apart upon the sides of the cylinder and of opposite polarity. In cooperation with a compass, the magnets identify the tool thus indicating its location when concealed prior to pulling wire through a house or other structure. The tool also spaces a bit extension tool away from interior faces of adjacent drywall panels. A setscrew secures the cylinder upon the shank of a bit extension for rotation of the tool. The magnets are integrated into the cylinder of the tool to survive ordinary handling, drilling through wooden structures, and rotation. The tool emanates a magnetic field from within a concealed location that deflects a compass for revealing the location of the tool.

4 Claims, 5 Drawing Sheets

ALIGNMENT AND LOCATING TOOL

CROSS REFERENCE TO RELATED APPLICATION

This non-provisional application claims priority to non-provisional application Ser. No. 11/567,611 filed on Dec. 6, 2006 which claims priority to the provisional application Ser. No. 60/748,357 filed on Dec. 7, 2005 and to the non-provisional application Ser. No. 10/880,399 filed on Jun. 29, 2004 (now U.S. Pat. No. 7,093,822) and all are commonly owned by the same inventor.

BACKGROUND OF THE INVENTION

The present invention relates to locating an object within a wall, such as when routing electrical wires through walls. The magnetized drill bit extension has particular utility indicating the location of a drill bit not visible through a wall.

Before pulling wire in walls, the present invention, in cooperation with a bit, prepares a hole and indicates the location of the hole within a wall. Wire can then be pulled through the hole using a magnetic wire pulling system. Magnetic wire pulling systems assist electricians in routing conduits or wires through intersections of walls and floors, and difficult to reach places in structures. In structures, electrical wiring looks unsightly and architects and electricians labor to hide the wiring. In new construction, electricians run wire through floors, walls, and ceilings before the finished surface is installed. In existing structures, electricians run wires inside finished walls, floors, and ceiling spaces. In other buildings, electricians have to fish wire between two desired locations. Fishing wire includes running a tape, or a string, first between desired locations. Then an electrician ties a pulling cord to the string and advances the pulling cord to the second location. Third, the electrician ties wire or conduit to the pulling cord and advances the wire to the second location for installation in a fixture.

When fishing wire, electricians encounter obstacles within structures that impede wire from advancing to a second location. Sill plates at wall and floor intersections, headers at wall and ceiling intersections, and rafters in attics, among others, impede fishing of wire. Commonly, electricians use a steel band, known as fish tape, to overcome an obstacle during fishing. An obstacle usually takes many attempts before the electrician successfully advances the fish tape beyond the obstacle. An electrician inserts the fish tape at a known point and extends the tape beyond the obstacle to reach a second point. At the second point, an electrician, if skilled, may hit it precisely or more likely, an electrician has to capture the fish tape with a second piece of fish tape. With fish tape being steel, magnets can capture fish tape at the second point.

DESCRIPTION OF THE PRIOR ART

The use of a magnets to assist electricians in wire pulling is known in the prior art. For example, the patent to Flowers, U.S. Pat. No. 4,527,775, shows a fish tape device that has a roller on the end which is guided by a magnet outside of the wall. This patent specifically refers to feeding conduit but not Romex cable or other types of electrical wiring. This patent does not have a magnetized head within the roller.

The patent to Hale, U.S. Pat. No. 4,572,561, shows a device for locating a wire with an iron slug upon the end. This patent has a liquid filled container that has a magnet within, which responds as it approaches the slug on the wire placed within a wall. And, the patent to James, U.S. Pat. No. 5,522,630, shows an electromagnet lowered into and through a wall, where fish tape secures to the electromagnet. The present invention does not use electrically induced magnetism.

Wire pulling devices, such as fish tape or rod, have seen use in construction and renovation across the country. The fish tape passes through holes in cap plates and sill plates and then guides wire through a wall or around an obstacle. The fish tape though requires holes drilled through the cap plates and sill plates for passage of the fish tape. Such holes are made by extension bits generally upon shanks in lengths exceeding three feet. Guiding an extension bit to the precise location for a hole, in a cap plate or a sill plate, drilled blind requires practice and skill. Misdirected extension bits can damage adjacent pieces of drywall, necessitating repair or replacement of drywall with all of the associated cost and delay. Once a hole is drilled in a cap plate, the hole can be identified at the drilling location but not beneath the hole in the adjacent lower story of a structure.

The present invention overcomes the difficulty of aiming an extension bit concealed within a wall and finding a hole drilled above a story of a structure and concealed within the upper corner of a wall. The present invention also allows a common magnetic compass to find it when concealed.

While the above-described devices fulfill their respective, particular objectives and requirements, the aforementioned patents do not describe an aligning and locating tool that has a spacer with a magnet, that identifies its concealed location to a compass outside a wall.

Therefore, a need exists for a new and improved aligning and locating tool that fits upon a bit extension and that can be used for locating a bit or hole concealed behind a wall in a structure. The present invention substantially fulfills this need. Further, the aligning and locating tool substantially departs from the conventional concepts and designs of the prior art. In doing so, the present invention provides a device primarily developed for the purpose of guiding a bit extension away from the interior face of drywall when concealed within a wall and also locating by a compass to identify concealed hole locations in a structure, typically at the upper corner of a wall.

SUMMARY OF THE INVENTION

In view of the foregoing disadvantages inherent in the known types of wire locators in the prior art, the present invention provides an improved aligning and locating tool, and overcomes the disadvantages and drawbacks of the prior art. As such, the general purpose of the present invention is to provide a new and improved aligning and locating tool which has all the advantages of the prior art mentioned heretofore and many novel features that result in an aligning and locating tool which is not anticipated, rendered obvious, suggested, or even implied by the prior art, either alone or in any combination thereof.

To attain this, the present invention essentially comprises a non-marring cylinder with a pair of magnets, diametrically spaced apart upon the sides of the cylinder and of opposite polarity and using a compass to identify the tool thus indicating its location when concealed prior to pulling wire through a house or other structure. The tool indicates its position and spaces the bit extension tool and bit contained therein from interior faces of adjacent panels of drywall. The magnets are integrated into the cylinder of the tool so that the magnets survive ordinary handling, drilling through wooden structures, and rotation. The tool emanates a magnetic field from within a wall, or concealed location, that deflects a compass, thus revealing the location of the tool.

There has thus been outlined, rather broadly, the more important features of the invention in order that the detailed description thereof that follows may be better understood and in order that the present contribution to the art may be better appreciated.

The aligning and locating tool may also include a setscrew to secure the cylinder upon a shaft, pins or swaging to secure the magnets to the cylinder, and chemical welding of the magnets to the cylinder among other ways of joining the magnet to the socket.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved aligning and locating tool that has all of the advantages of the prior art and none of the disadvantages.

It is another object of the present invention to provide an aligning and locating tool that may be readily and efficiently manufactured and marketed.

It is still another object of the present invention to provide an aligning and locating tool that may be readily applied to renovations and repairs in existing structures.

Still another object of the present invention is to provide an aligning and locating tool that follows behind the head of an extension bit while minimizing cosmetic and structural damage caused by the head.

Lastly, it is an object of the present invention to provide an aligning and locating tool that indicates the location of a drill bit when concealed within a structure.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

The present art overcomes the prior art limitations by providing a magnetic cylinder upon a bit extension for detecting the same within a structure, typically a residential frame house.

Figure 1:
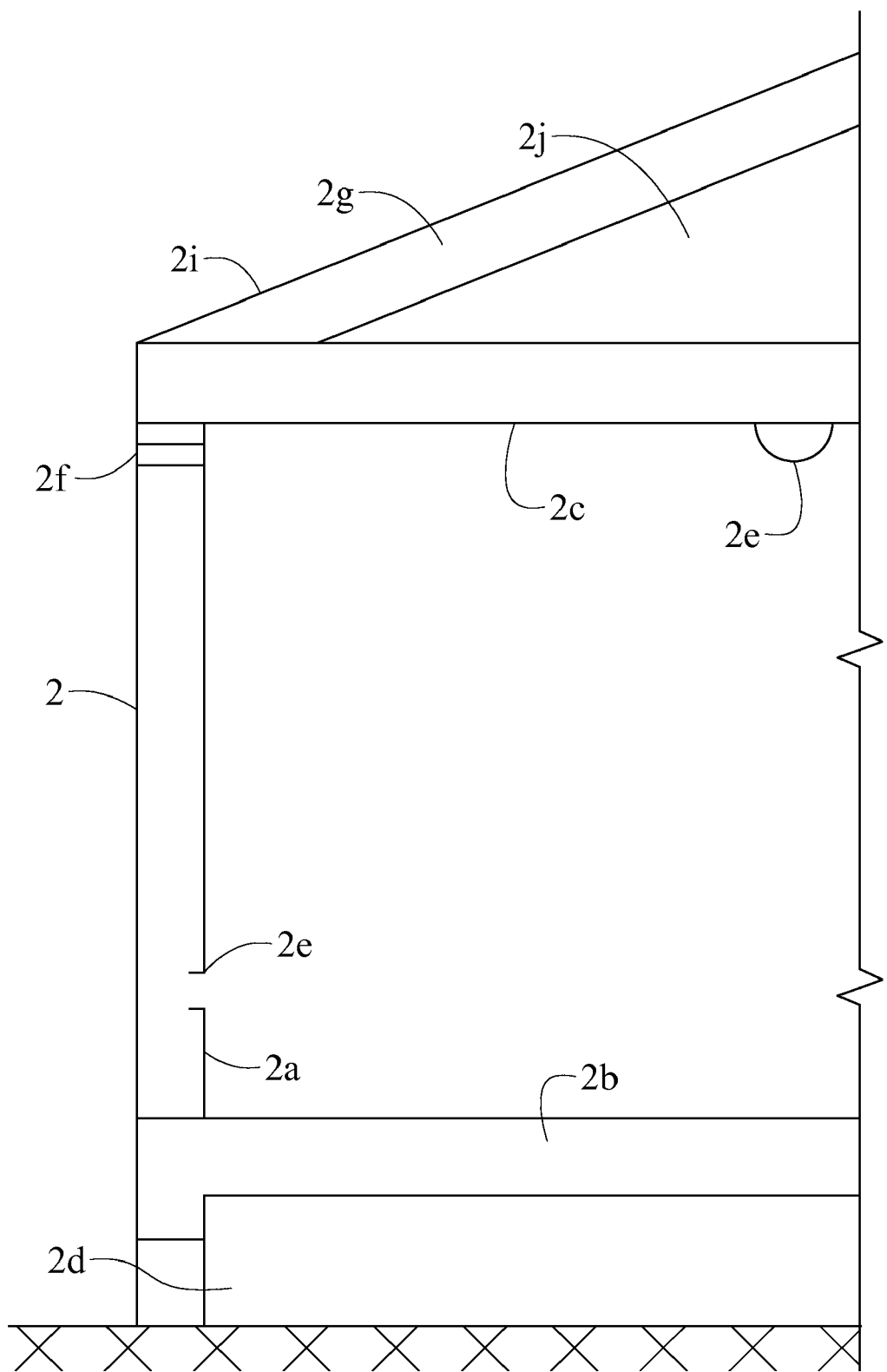
FIG. 1 is an elevation view of the structure of a house in which operates the preferred embodiment of the magnetized drill bit extension of the present invention.

In FIG. 1, the structure of a house is shown where the magnetic drill extension 1 operates. Though the preferred embodiment of the present invention is described in reference to a house 2, the present invention can be used in other structures. The present invention overcomes the obstacles inherent with the intersections of walls 2a, floors 2b, and ceilings 2c. Thus, FIG. 1 shows a house 2 with a crawlspace 2d upon the earth. Above the crawlspace 2d, the house 2 has a floor 2b with a wall 2a at the exterior. The wall 2a has an opening for one or more fixtures 2e. The fixtures 2e can be outlets, switches, and the like. The wall 2a has a cap plate 2f upon the top opposite the floor 2b and a sill plate 2h. The cap plate 2f serves as a support for the ceiling joists. The joists 2c are parallel and separated one story in height above the floor 2b. Suspended from the joists 2c, a fixture 2e illuminates the floor 2b. Here, the fixture 2e is a light however other fixtures, such as fans, are possible. From the joint of the joists 2c with the wall 2a, rafters 2g rise at an angle towards the center of the house 2. The rafters 2g support the roof 2i and an attic 2j exists beneath the roof. Attics 2j are often insulated and rafters 2g have an acute angled connection to the cap plate 2f increasing the difficulty in running wires.

Figure 2:
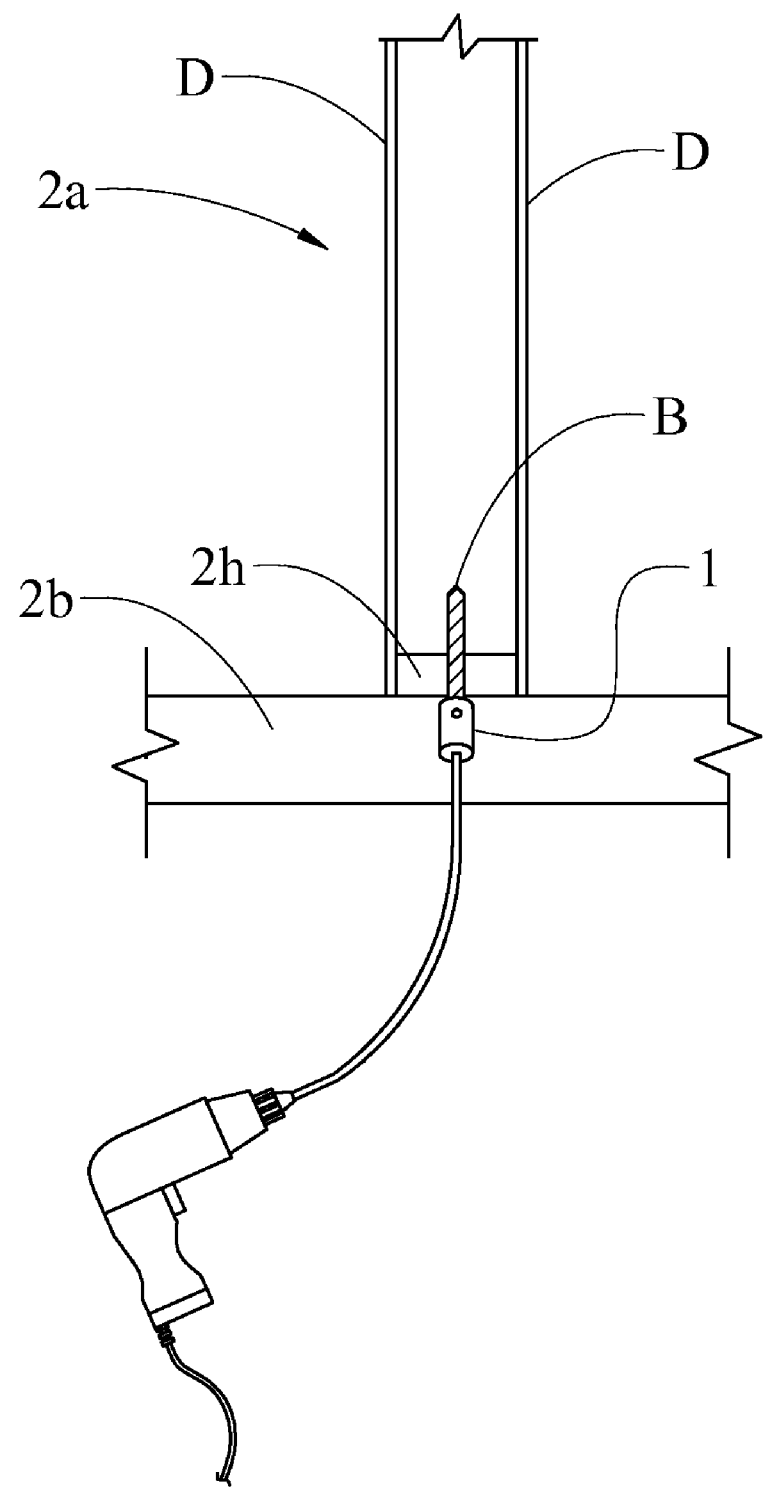
FIG. 2 is a detailed view of a wall and a sill plate through which the present invention drills.

In walls as in FIG. 2, an electrician may want to pull wire from a lower floor through a wall 2a for further pulling into an upper floor 2b. To begin, an electrician attaches the present invention 1 behind the cutting head of an extension bit and then places the shank of the extension bit into the chuck of a portable drill. An electrician then places the present invention and cutting head B between joists for drilling upwardly. The present invention generally has a greater diameter than the width of the cutting head. The present invention is then secured upon the shank as a stop to prevent the advance of the cutting head B once the present invention abuts an object, as a sill plate shown as 2h. The sill plate is flanked by sheets of drywall D upon each side as is known in typical residential construction. In use, the cutting head advances through the sill plate and the present invention then abuts the sill plate. The greater diameter of the present invention than the cutting head B prevents the cutting head from damaging adjacent drywall D.

Figure 3:
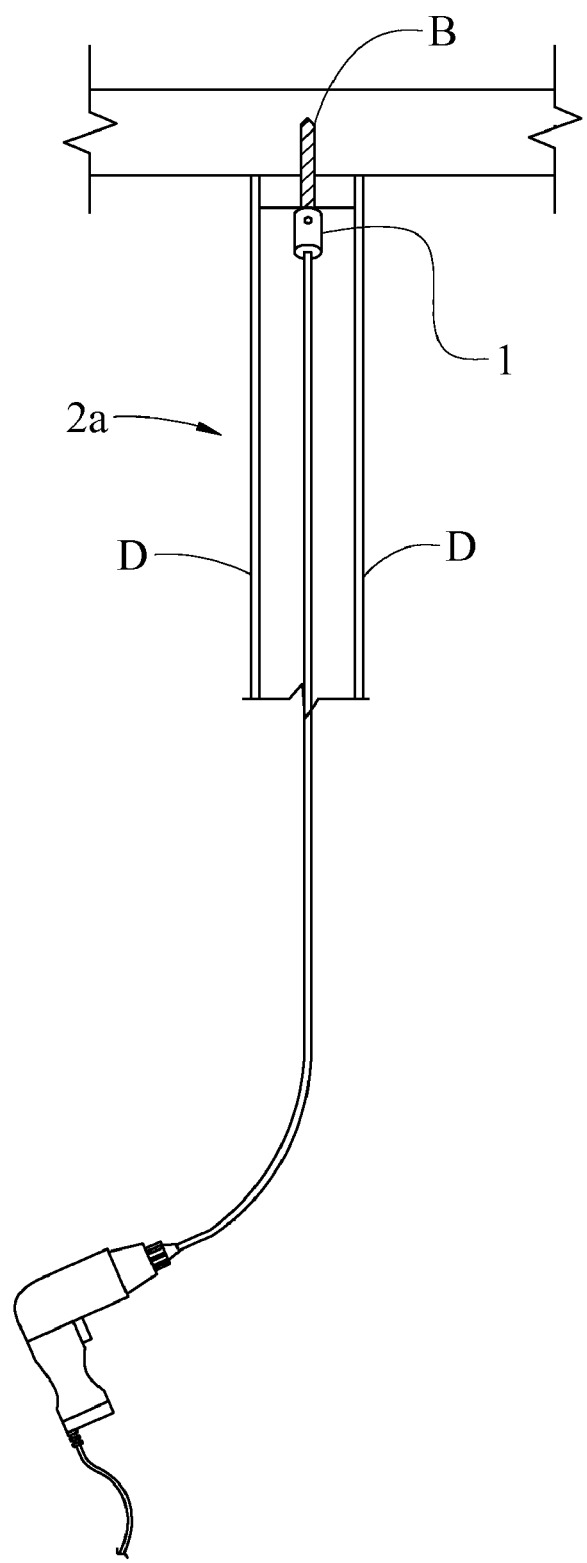
FIG. 3 is another detailed view of a wall and a cap plate through which the present invention drills.

Alternately, an electrician inserts the present invention 1 secured behind the cutting head B of an extension through an opening in a wall and directs the extension upwardly as in FIG. 3. The opening is generally wider than the diameter of the present invention. The greater diameter of the present invention 1 than the cutting head, along with the length of the bit extension, prevents the cutting head from damaging the inside face of the drywall as the bit extension advances upwardly. The electrician then drills and advances the present invention upward into and through the cap plate. When through the cap plate, the electrician stops the drill with the present invention 1 still through the new hole.

The present invention 1 has a magnet 3 within a body 4 of the tool 1 later shown in FIGS. 4-7. The magnet 3 emanates a field of sufficient strength to penetrate drywall, or sheetrock, and at least one foot beyond the wall. With the drill stopped and the present invention abutting an object, the electrician proceeds to a location near the wall. The electrician then opens a magnetic compass and holds the compass horizontal and near the intersection of the wall and the floor below or floor above. The electrician notes the orientation of the needle in the compass and then powers the drill slowly. The rotation of the magnet 4 then deflects the compass needle noticeably as the compass is brought close to the present invention 1. As the compass nears the present invention 1, the needle will rotate noticeably. Where the compass needle deflects at the maximum in angle of rotation or in number of deflections per second, the location of the present invention 1 is thus known when concealed as by joists and studs or behind the sheetrock, or drywall. The electrician marks that spot as a reference point for fish tape or a magnetic wire pulling system.

Figure 4:
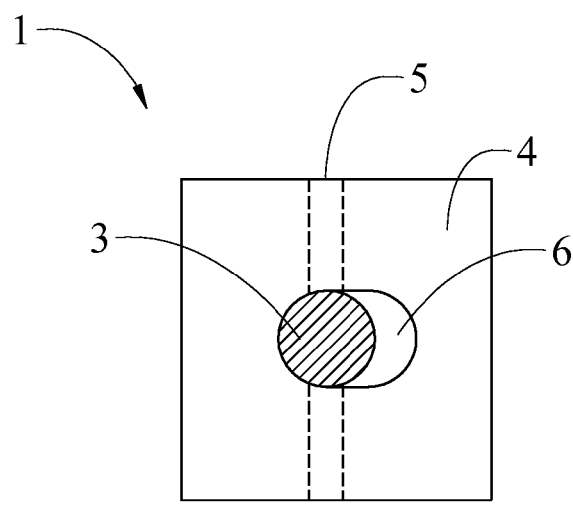
FIG. 4 is a side view of the preferred embodiment of the present invention.

Turning to FIG. 4, the present invention 1 comprises a body 4 generally round and cylindrical in shape with a central axial aperture 5 for insertion of the shank of a bit extension. The aperture 5 extends perpendicular to the diameter of the body. The body has sufficient thickness to receive at least one magnet 3, preferably two, generally embedded upon a chord and the flat surface of the magnet, if any, located perpendicular to the diameter of the body. Here the magnets 3 are shown round and generally cylindrical, though of much less diameter than the body. Each magnet is embedded within a recess 6 upon the perimeter of the body and generally centered upon the thickness of the body. The magnet is thus flush or slightly inside of the perimeter of the body thus preventing the magnet from snagging upon edges and objects within a wall during usage.

Figure 5:
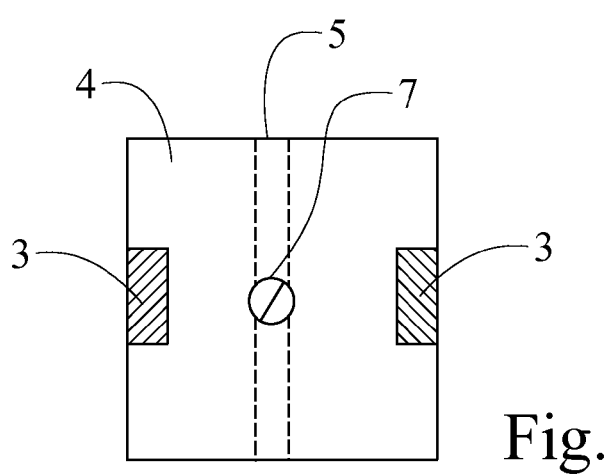
FIG. 5 is a side view ninety degrees from FIG. 4 of the preferred embodiment.

Turning the body ninety degrees, FIG. 5 shows the body with a setscrew 7 extending into the body and into the aperture 5. The setscrew is generally upon a radius of the body and centered upon the thickness of the body and between the magnets 3. The setscrew 7 has a slotted head, or other connection shape in the head, upon one end and an opposite end, flat or concave, that abuts the shank of the bit extension. Turning of the setscrew clockwise tightens the body upon the shank so that the body rotates with the shank when it is turned by the drill. The material of the body resists the repeated turning of the setscrew or alternatively, the body is provided with an embedded threaded hollow cylinder that receives the setscrew in a cooperative relationship. FIG. 5 also shows two magnets 3 located diametrically opposite one another. The magnets are provided of opposite polarity where one magnet has the positive pole outwardly of the body and the other magnet has the negative pole outwardly of the body and the first magnet. Using magnets of opposite polarity triggers deflection of the compass needle when brought near the rotating tool 1 as previously described.

Figure 6:
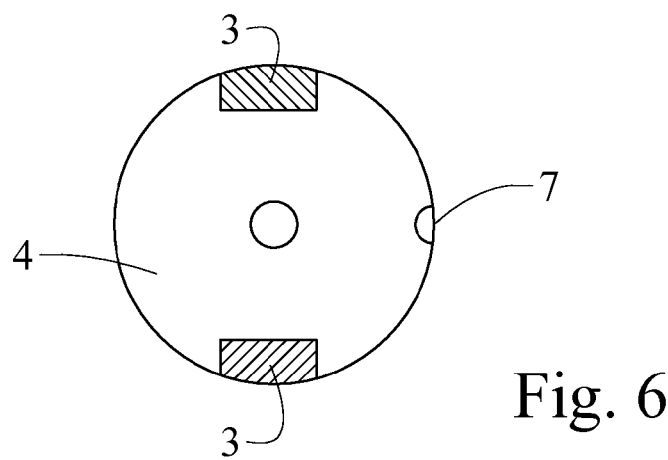
FIG. 6 is a top view of the preferred embodiment.

A top view of the body is shown in FIG. 6 where the body has the magnets 3 diametrically opposite from one another with the aperture 5 generally centered between the magnets. The setscrew 7 is generally located ninety degrees from both magnets 3 upon a radius to the aperture. Though one setscrew is described, additional setscrews are permitted with this invention as needed. Though one magnet is the minimum for this invention and two magnets of opposite polarity are preferred, additional magnets are also possible for this invention.

Figure 7:
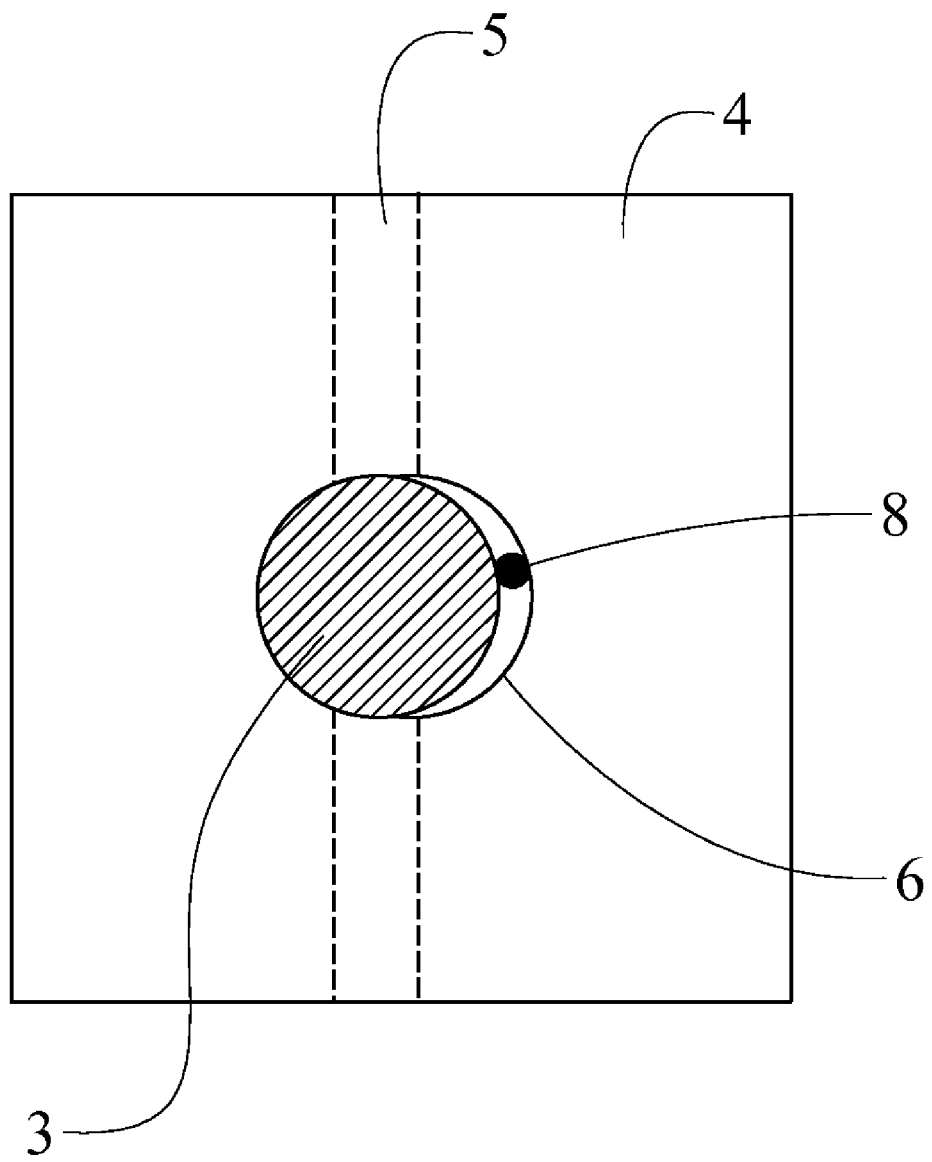
FIG. 7 is a side view of the preferred embodiment showing mechanical embedment of a magnet into the cylinder of the present invention.

As the present invention 1 rotates, often at high rates of revolutions per minute, the magnets 3 must be secured to the body 4. The present invention has the magnets locating within recesses 6 as shown in FIG. 7. The recess for each magnet is slightly oversized, or partially elliptical, to admit a pin 8 upon the perimeter of the magnet and oriented towards the aperture 5. The pin is driven beside the magnet and into the body. The friction between the magnet and the pin secures the magnet within the recess for when the present invention is used. The pin is generally cylindrical and of lesser diameter than the aperture and generally the pin is at least twice as long as a magnet is thick.

An alternate means of joining the magnet 3 to the body 4 involves chemically welding the magnet to the body as with JB Weld® and other compounds that join steel parts to polymer parts via a chemical reaction. A further alternate means of joining the magnets within the body is through a swage where the magnet has slightly more diameter than the recess. The magnet is then forcibly advanced into the recess. And the material of the body then tightly fits upon the perimeter of a magnet.

From the aforementioned description, an aligning and locating tool has been described. The aligning and locating tool is uniquely capable of indicating the location of a drill bit concealed within a wall to a compass outside the wall in a structure. The aligning and locating tool and its various components may be manufactured from many materials, including but not limited to steel, nickel, molybdenum, polymers, nylon, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A device that aligns and locates a bit extension from within a wall, said device comprising:
    a body, generally cylindrical with a thickness, a diameter exceeding that of the bit extension, and a perimeter, having a centered aperture therethrough, said body adapting for installation upon the bit extension, said body being non-magnetic and non-marring, and said diameter of said body adapting to space said body away from the plane of said wall; and,
    at least one magnet proximate the perimeter of said body and generally centered upon the thickness of said body, said at least one magnet having a flat surface perpendicular to the diameter of said body.

2. The aligning and locating device of claim 1 further comprising:
    said body having at least one recess in the perimeter to receive said at least one magnet, said recess having a depth providing a flush position of said at least one magnet with the perimeter of said body; and,
    at least one setscrew approximately ninety degrees in rotation from said at least one magnet, said setscrew extending radially from said perimeter into said aperture for securing said device upon the bit extension.

3. The aligning and locating device of claim 2 wherein said body includes two of said recesses diametrically opposed and two of said magnets locating within said recesses and having mutually opposite polarity.

4. The aligning and locating device of claim 3 further comprising:
    said magnets securing to said recesses by one of mechanical fasteners, or pressing into said recesses.

* * * * *